April 1, 1930.  J. KINDERVATER  1,752,954
LOCOMOTIVE CONNECTING ROD
Filed Feb. 26, 1926
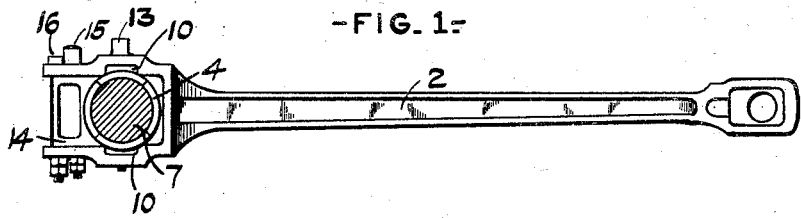
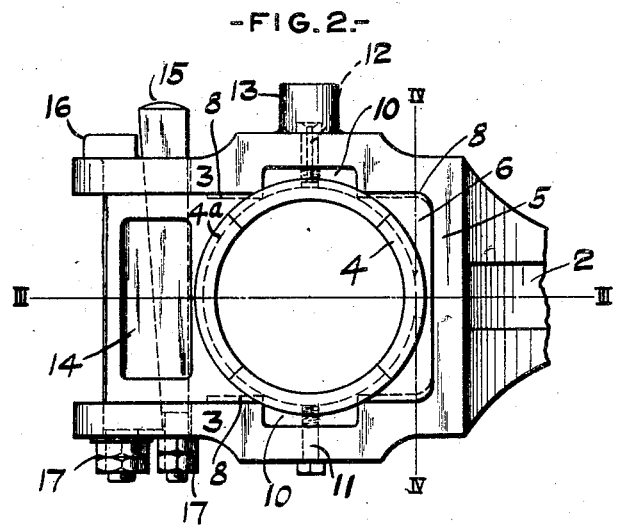
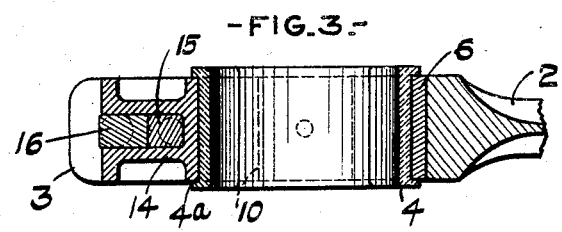
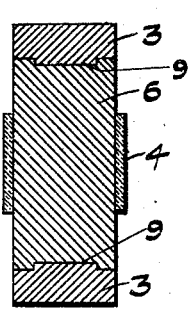
INVENTOR
Julius Kindervater
BY
Clarence O. Kerr
ATTORNEY Patented Apr. 1, 1930

1,752,954

UNITED STATES PATENT OFFICE

JULIUS KINDERVATER, OF BROOKLYN, NEW YORK

LOCOMOTIVE CONNECTING ROD

Application filed February 26, 1926. Serial No. 90,999.

My invention relates to locomotive engine main or connecting rods of the type in which a floating bushing is used to form the main crank pin bearing, and has for its object the improvement of the rod structure so that the wear occasioned by the rotation of the floating bushing will not affect the rod structure. To this end I have provided removable intermediate bearing members interposed between the crank pin bearing and the rod body, which absorb substantially all the wear resulting from the relative movement of the parts.

While my invention is particularly designed to obviate difficulties in connection with the use of floating bushings with the center main rod of a three-cylinder engine, it is equally applicable to all locomotive engine rods.

The improvement claimed is hereinafter fully set forth.

In the accompanying drawings: Figure 1 is a side elevation of a locomotive main rod embodying my invention; Fig. 2, a side elevation of the crank pin end thereof, on an enlarged scale; Fig. 3, a horizontal section, on the line III—III of Fig. 2 and, Fig. 4, a transverse vertical section, on the line IV—IV of Fig. 2.

In the practice of my invention, referring descriptively to the specific embodiment thereof which is herein exemplified, the main rod, 2, is formed at its crank pin end, with two vertically spaced, rearwardly extending arms, 3, between which are fitted a floating bushing, 4, formed of four separate segments, each having a pair of retaining flanges, 4ª, on its outer face.

Between the bushing 4 and the vertical face 5 of the rod an intermediate bearing block 6 is interposed, the vertical height of which closely approaches or equals the diameter of the crank pin 7. The block 6 thus presents an ample surface for receiving and transmitting the rod thrust, as well as an ample body at its upper and lower edges to overcome the tendency of the bushing 4 to pinch should heating occur.

The block 6 has on its top and bottom surfaces shallow recesses 8, into which fit the projections 9 of the rod, as is shown in Fig. 4. The block is inserted between the arms 3 from their rear and is slid forwardly guided by the projections 9, into correct position. Directly above and below the bushing on its vertical center line, blocks 10 are inset into recesses in the arms 3 of the rod. These blocks extend clear across the rod, as is indicated in Fig. 3, and are held in adjusted positions by the keepers 11 and 12, which pass through the arms 3 and are threaded into the blocks 10. The upper keeper 12 has an aperture therethrough to convey lubricant from the cup 13 to the bearing. To close the open end of the rod and form a substantial backing for the bushing 4 a filler block 14 is used, which has grooves 8 on top and bottom into which fit projections 9 on the rod similar to those used in connection with the block 6. The filler 14 is secured in the rod by means of a key 15 and a gib 16, in such a way as to prevent any tendency for the rod end to open, but provides just sufficient clearance to permit the bushing 4 to revolve, as clearly shown in Fig. 2. This is accomplished when the rear walls of the grooves 8 contact with the rear faces of the projections 9. The elements are secured in proper position by means of suitable nuts 17.

The inner block 6, inset blocks 10 and filler block 14 have their inner faces curved to fit the bushing 4, which they completely surround and hold away from any bearing upon the body of the rod.

The replacement or renewal of the bushing 4, even with the middle main rod of a three cylinder locomotive, may be readily accomplished without taking the main rod down. To replace the bushing 4 in the middle main rod the key, 15, and gib, 16, are first removed, thus permitting the filler block 14 to be pulled backward out of the rod end and removed. The removal of the block 14 exposes two segments of the bushing 4, which can be slid around the crank pin and removed. If the rod is then moved forwardly, access will thus be given to the remaining two segments on the front side of the crank pin to permit their removal. The blocks 6, 10 and 14 may then be examined to ascertain whether they have become worn and, if worn, their curved surfaces may be reformed or the blocks replaced. To reform the blocks parts can be welded on their arcuate surfaces and the surfaces reformed to the proper diameter. Or the worn blocks can be moved toward the center of the floating bearing and rebored to proper diameter, liners being inserted behind the blocks 6, 10 and 14. The rear walls of the grooves or the rear faces of the projections 9 are suitably cut away to permit the block 14 to assume its new position, care being taken that sufficient clearance be provided to permit the floating bushing to freely revolve. In reassembling, the block 6 is first inserted, after which the inset blocks 10 are placed in position and drawn up by their keepers 11 and 12. The two forward segments of the bushing 4 would next be applied and the rod 2 moved backwardly so as to bring these two segments into bearing against the front half of the crank pin 7. The remaining bushing segments would then be applied and the filler block, 14, slid forward into bearing with them. The key, 15, and gib, 16, may be then inserted and secured in their proper location.

Obviously, where my invention is applied to outside main rods the operation of replacing or renewing any of the parts is much simpler than that just described with the middle main rod.

My invention comprises a mechanism which is simple in construction, easy of manipulation, is productive of greater service from locomotives and at the same time results in decreased maintenance costs.

I claim as my invention and desire to secure by Letters Patent:—

1. A locomotive connecting rod having a pair of spaced longitudinally extending arms at one end thereof provided with oppositely disposed transverse channels; a sectional bearing block comprising side sections disposed in said channels, an outer section, and an inner section, said inner section supported on said rod; means for securing said side sections in fixed relation to each other; means for securing said outer section in fixed relation to said side sections; and a floating sectional bushing in the bearing block, comprising means for preventing axial movement thereof relative to said bearing block.

2. A locomotive connecting rod having a pair of spaced longitudinally extending arms at one end thereof provided with oppositely disposed transverse channels opening into said space, and tongues extending from the outer and inner sides of said channels and projecting into said space, a sectional bearing block comprising side sections disposed in said channels, an outer section having grooves engaging the tongues extending from the outer sides of the channels, and an inner section supported on said rod, and having grooves engaging the tongues extending from the inner side of said channels; means for securing said side sections in fixed relation to each other; means for securing said outer section in fixed relation to said side sections; and a floating sectional bushing in the bearing block, comprising means for preventing axial movement thereof relative to said bearing block.

JULIUS KINDERVATER.